(12) United States Patent
Eberling et al.

(10) Patent No.: US 8,783,791 B2
(45) Date of Patent: Jul. 22, 2014

(54) DUAL CIRCUIT PNEUMATIC FOOT VALVE WITH ELECTRONICALLY CONTROLLED PROPORTIONAL MODULATOR (ECPM) AND OPERATOR INPUT SENSING

(75) Inventors: Charles E. Eberling, Wellington, OH (US); Mark A. Bennett, Lagrange, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 36 days.

(21) Appl. No.: 13/483,314

(22) Filed: May 30, 2012

(65) Prior Publication Data

US 2013/0320751 A1 Dec. 5, 2013

(51) Int. Cl.
*B60T 13/74* (2006.01)

(52) U.S. Cl.
USPC ............... 303/3; 303/155; 303/14; 303/113.4

(58) Field of Classification Search
CPC ..... B60T 8/175; B60T 8/1755; B60T 15/045; B60T 17/22; B60T 17/18
USPC ............... 303/3, 15, 127, 139, 140, 146, 155, 303/113.1, 113.2, 113.4, 113.5, 115.1, 303/115.2, 118.1, 20, 22.8, 186, 188, 14; 137/627.5
See application file for complete search history.

(56) References Cited

U.S. PATENT DOCUMENTS

| | | | |
|---|---|---|---|
| 5,294,190 A | | 3/1994 | Feldmann et al. |
| 5,427,440 A | * | 6/1995 | Ward et al. .................. 303/3 |
| 5,986,544 A | * | 11/1999 | Kaisers et al. ............. 340/431 |
| 6,203,115 B1 | | 3/2001 | Rosendahl et al. |
| 6,644,758 B1 | * | 11/2003 | Stumpe ..................... 303/9.66 |
| 6,659,244 B2 | | 12/2003 | Goodell |
| 6,758,298 B2 | * | 7/2004 | Eberling et al. ............ 180/272 |
| 6,953,228 B2 | | 10/2005 | Leske et al. |
| 7,309,111 B2 | | 12/2007 | Herges et al. |
| 7,520,572 B2 | | 4/2009 | Hatipoglu et al. |
| 2005/0218719 A1 | * | 10/2005 | Hatipoglu et al. .......... 303/188 |
| 2006/0017317 A1 | | 1/2006 | Howell et al. |

OTHER PUBLICATIONS

BVA-85 Brake Valve Actuator, 2 pages, 2005 Bendix Commercial Vehicle Systems LLC.

* cited by examiner

*Primary Examiner* — Thomas Irvin
(74) *Attorney, Agent, or Firm* — Fay Sharpe LLP

(57) ABSTRACT

A foot valve that can be activated either by the driver or an electronic control unit, wherein the foot valve can be the central driving device for automated braking applications such as Hill Start Aid and Work Brake Systems. Pneumatic pressure delivered by an electronically controlled proportional modulator to the foot valve activates either primary and/or secondary portions of the brake valve. The driver can mechanically override the electronic intervention when he presses on the brake pedal. For applications such as ESC and ATC, driver demand can be sensed by sensors in the foot valve and transmitted to the braking system electronic controller on the vehicle.

18 Claims, 3 Drawing Sheets

DUAL CIRCUIT PNEUMATIC FOOT VALVE WITH ELECTRONICALLY CONTROLLED PROPORTIONAL MODULATOR (ECPM) AND OPERATOR INPUT SENSING

BACKGROUND

The present exemplary embodiment relates to a braking system for a vehicle. It finds particular application in conjunction with a foot valve for a braking system, and will be described with particular reference thereto. However, it is to be appreciated that the present exemplary embodiment is also amenable to other like applications.

A typical vehicle braking system for a straight truck, bus, tractor, or trailer, includes a source of pressurized air along with valves for selectively directing the air to brake chambers at the wheels of the vehicle. Vehicle air brake systems typically include a primary circuit, which is often used for driven wheels, and a secondary circuit, which is often used for non-driven wheels. The vehicle has a dual brake valve, or foot brake valve (FBV), which is a valve in both the primary circuit and the secondary circuit that is controlled by the foot pedal (brake pedal) of the vehicle in response to driver demand for braking. The dual brake valve is supplied with high pressure air from one or more reservoirs. When the valve is actuated by driver applied force on the brake pedal, this high pressure air is directed into the primary and secondary braking circuits of the vehicle. Many such vehicle braking systems provide an antilock braking system (ABS) function, by which an electronic control unit (ECU) selectively releases and applies braking at individual wheels to prevent wheel lockup.

Some vehicle braking systems also provide an automatic traction control (ATC) function. In one aspect of ATC, an ECU selectively applies braking at individual wheels to match wheel speeds side to side to help control wheel spin that occurs in response to driver demand via the accelerator pedal. This control is typically effected by controlling a wheel end modulator associated with the wheel. The modulator provides an air flow path to the wheel that can be rapidly opened or closed by a solenoid under the control of the ECU.

In order to provide the ATC function, high pressure air typically is made available at the wheel end modulators in the absence of driver demand. This is commonly done by having a constant supply of high pressure air from a reservoir to an ATC solenoid that is associated with the modulators on the driven axle. In an ATC event, the ATC solenoid is energized under the control of the ECU to direct the high pressure air from the reservoir to the modulators. The modulators are then controlled by the ECU selectively to apply and release braking force to the wheels, to control any wheel spin.

As one example, FIG. 1 shows schematically some portions of a prior art vehicle braking system that is operative to provide ATC on a straight truck, or bus. The system is also ABS effective. The system includes a foot brake valve (FBV) that normally provides driver demand proportioned air pressure as a control air flow to a relay valve (designated ATC) associated with the driven wheels of the vehicle. The relay valve includes an ATC solenoid that is controlled by an ECU. The ATC solenoid is normally de-energized, in which case driver demand proportioned air is used as the control pressure on the relay valve, to control the flow of air from the reservoir to the rear axle modulators. When the ECU determines that the traction control function is desired, the ECU energizes the ATC solenoid on the relay valve, which opens the relay valve immediately, in spite of the lack of driver demand controlled pressure. Reservoir air pressure is provided to rear modulators M. The rear modulators M, under the control of the ECU, use that air to modulate brake pressure in the brake actuators, thus controlling the spinning of the rear wheels.

Some vehicles with dual brake valves also have a brake valve actuator (BVA), which is an actuatable device interposed between the valve and the brake pedal that applies enough force to the brake valve so that the brake valve's output (delivery pressure to the primary and secondary circuits). The BVA is operated, for example, (piloted by, or receives a pneumatic control signal from) by (a) a pneumatic on/off control valve actuated by the driver's hand like a switch, or (b) an on/off solenoid valve controlled by an on/off electrical switch operated by the driver's hand. The BVA is used to conduct a pre-trip inspection, in which the brakes are set and held in an applied condition so that the driver can check the braking system of the vehicle without having to be in the cab pressing on the brake pedal. U.S. Pat. No. 6,659,244 shows the use of a brake valve actuator in a vehicle air braking system.

It is also known to control a brake valve actuator (BVA) of a vehicle with an ECU to provide ATC, yaw stability (YS) and ESP functions for the vehicle. These functions require supply (reservoir) air to be available to the vehicle's wheel end modulators in the absence of driver demand (brake pedal movement). This is effected by having the ECU control the BVA to actuate the dual brake valve without driver intervention.

An example of such a system is disclosed in U.S. Pat. No. 7,520,572, wherein the ATC function is provided by making braking pressure available at the driven wheels only of the vehicle. This may be done by blocking the modulators for the non-driven wheels so that no braking effect is provided at the non-driven wheels. At the same time, the modulators for the driven wheels are controlled to enable selective braking, under control of the ECU, of the driven wheels. The ATC function in this manner can be provided for a straight truck or bus, or for a tractor and trailer, without the need for an ATC solenoid. For a tractor and trailer, there is a need to be able to stop pressure delivery to the trailer, which is typically met by a standard modulator controlling the trailer delivery directly from the brake ECU.

That is, since the modulators for the non-driven wheels can hold, and not allow any new pressure to go to their associated brakes, the system can supply full air pressure to them, and allow the modulators to block it. The system can use the existing brake valve (under control of the BVA) to provide the supply air, and so there is no need for an ATC valve for either the driven or non-driven wheels.

While this design has met with commercial success, there is still room to improve the system.

BRIEF DESCRIPTION

Aspects of this disclosure are directed to a foot valve that can be activated either by the driver or an electronic control unit in a proportional manner, wherein the foot valve can be the central driving device for automated braking applications such as Hill Start Aid and Work Brake Systems, thereby eliminating several separate controllers and solenoids of prior art systems. Pneumatic pressure delivered to the foot valve by an electronically controlled proportional modulator activates the primary and/or the secondary portions of the brake valve. The driver can mechanically override the electronic intervention when he presses on the brake pedal. For applications such as ESC, driver demand can be sensed by sensors in the foot valve and transmitted to the braking system electronic controller on the vehicle.

In one aspect, a foot control valve assembly for operating a vehicle brake system having an associated brake pedal and at least one braking circuit associated with one or more wheels of the vehicle, the valve assembly comprising a brake valve for selectively applying braking pressure to the at least one braking circuit of the vehicle, the brake valve being proportionally actuatable by a vehicle operator via a plunger operatively connectable to the associated brake pedal, a brake valve actuator for selectively actuating the brake valve to effect an autonomous braking function, the brake valve actuator responsive to a pneumatic control signal, an electronically controlled proportional modulator responsive to an electronic control signal received from an associated controller, the electronically controlled proportional modulator configured to modulate the pneumatic control signal provided to the brake valve actuator to control actuation of the at least one brake valve during an autonomous braking event, and at least one sensor for sensing driver braking demand, the sensor configured to communicate sensed driver braking demand to the associated controller.

The plunger can be actuated via the associated brake pedal to operate the brake valve to deliver pressure to the braking circuit regardless of the state of the electronically controlled proportional modulator. A first end of the plunger can be adapted for connection to the associated brake pedal, and a second end of the plunger can be adapted to actuate the at least one brake valve. The brake valve, plunger, the brake valve actuator and the electronically controlled proportional modulator can be supported by a common housing. The brake valve actuator can be a pneumatically actuated device that is configured to actuate the at least one brake valve. The brake valve actuator can include a pneumatic piston. The electronically controlled proportional modulator can be provided with supply air, the electronically controlled proportional modulator being responsive to the associated controller for selectively directing supply air to the brake valve actuator for actuating the at least one brake valve independently of the vehicle brake pedal. The electronically controlled proportional modulator can include a normally closed solenoid valve supplied with line pressure and a normally open solenoid valve, wherein during an autonomous braking event, the normally closed solenoid valve opens to supply the brake valve actuator with a supply of pressurized air, and the normally open solenoid valve is cycled to selectively vent air to atmosphere to thereby control the pressure supplied to the at least one brake valve. The at least one sensor can include a Hall effect sensor for sensing a position of the plunger. The electronically controlled proportional modulator can include a port for receiving a command signal from the associated controller.

In accordance with another aspect, a vehicle braking system includes at least one brake chamber, a foot valve control assembly as set forth in the previous two paragraphs operatively connected to the at least one brake chamber for supplying pressurized air thereto, and a controller operatively connected to the electronically controlled proportional modulator for supplying a control signal to the modulator for actuating the brake valve independently of actuation by a vehicle operator. The system can further comprise at least one sensor for sensing a dynamic vehicle condition, the electronic control unit generating the electronic control signal for actuating the brake valve actuator as a function of the dynamic vehicle condition.

In accordance with yet another aspect, a method of operating a vehicle brake system having a brake pedal and at least one braking circuit associated with one or more wheels of the vehicle comprises selectively applying braking pressure to the at least one braking circuit of the vehicle with a brake valve, the brake valve being proportionally actuatable by a vehicle operator via a plunger operatively connectable to the brake pedal, selectively actuating the brake valve independently of an operator input via the associated brake pedal with a brake valve actuator to effect an autonomous braking event, the brake valve actuator responsive to a pneumatic control signal, and modulating the pneumatic control signal provided to the brake valve actuator to control actuation of the at least one brake valve with an electronically controlled proportional modulator responsive to an electronic control signal received from a controller.

The method can further include sensing driver braking demand with a least one sensor adapted to sense a position of the plunger, and comparing the sensed data corresponding to driver braking demand to the controller to a level of braking associated with the autonomous braking event and terminating the autonomous braking event when the driver braking demand exceeds the level of braking associated with the autonomous braking event. The modulating can further include generating with the controller a control signal and communicating the control signal to the proportional modulator. The method can also include sensing a dynamic vehicle condition with at least one sensor, and generating a control signal based at least in part on the dynamic vehicle condition sensed, and/or supplying the electronically controlled proportional modulator with supply air and modulating the delivery of the supply air to the brake valve actuator to actuate the brake valve independently of the brake pedal, wherein the modulating includes exhausting a portion of the supply air to atmosphere.

In accordance with still another aspect, a foot control valve assembly comprises a brake valve for selectively applying braking pressure to the at least one braking circuit of the vehicle, the brake valve being proportionally actuatable by a vehicle operator via a plunger operatively connectable to the associated brake pedal, a brake valve actuator for selectively actuating the brake valve independently of an operator input via the associated brake pedal, the brake valve actuator responsive to a pneumatic control signal, and a means for controlling the pneumatic control signal provided to the brake valve actuator to proportionally control actuation of the at least one brake valve based at least in part on at least one of a dynamic vehicle condition.

In accordance with yet another aspect, an electronic controller unit for controlling an electronically controlled proportional modulator associated with a foot control valve assembly of a vehicle having a brake valve and a selectively actuatable brake valve actuator, the electronic controller unit comprising an input for receiving data from at least one sensor, an output for sending a control signal to the proportional modulator, a memory that stores computer-executable instructions, and a processor configured to execute the computer-executable instructions to generate the control signal. The computer-executable instructions comprising monitoring data received from the at least one sensor, determining when the data received from the at least one sensor indicates a vehicle condition for which an autonomous braking event is desired, generating a control signal based at least in part on the data received from the at least one sensor, and transmitting the control signal to the modulator via the output to effect an autonomous braking event.

The controller unit can further comprise a second input for receiving feedback from at least one of the modulator or the brake valve corresponding to a level of actuation of the brake valve. The feedback can include at least one of a plunger position of the foot valve or an output control pressure generated by the foot valve.

DETAILED DESCRIPTION

The present disclosure relates to a braking system for a vehicle. In particular, the present disclosure relates to a vehicle braking system that provides, for example, an automatic traction control (ATC) function, RSC, ASB, AEB and/or other automated braking functions. The invention is applicable to braking systems of differing constructions. For example, the invention is applicable to braking systems for vehicles having only two axles, with either one or both axles being driven, as well as vehicles having more than two axles with one or more being driven, and also vehicles (such as trailers) having no driven axles.

Many electronically controlled safety systems must apply the service brakes autonomously to correct for certain impending situations. Often it is also necessary to have an operator input auxiliary braking means. These systems can include ESP, RSC, ACB, AEB, ATC, work brakes, service-door interlock system, etc. Current methodologies generally require multiple actuation means throughout the current system architecture to effect the various automated and/or auxiliary braking functions. This complicates the system and does not consider industry recommended practices for brake balance.

Figure 2:
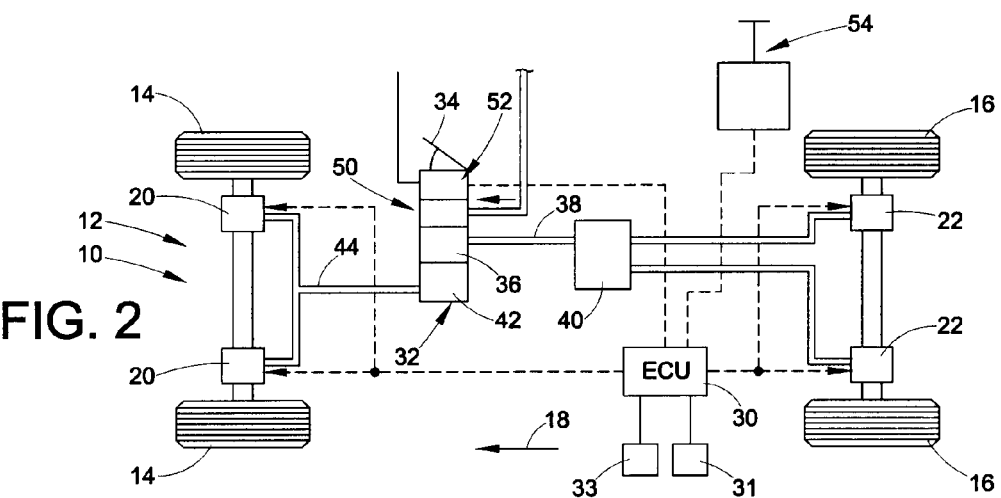
FIG. 2 is a schematic illustration of a braking system in accordance with a first embodiment of the invention for a straight truck or bus, having an ATC capability.

In FIG. 2, a representative vehicle braking system 10 is illustrated. The braking system 10 forms a part of a vehicle 12 having non-driven wheels 14 and driven wheels 16. The illustrated vehicle 12 is a rear wheel drive vehicle and so a forward direction in the vehicle is indicated by the arrow 18. The arrangement of driven wheels 16 and non-driven wheels 14 could be different in other vehicles, for example, in a front wheel drive vehicle. Two ABS wheel end modulators 20 are associated with the non-driven wheels 14, and two ABS wheel end modulators 22 are associated with the driven wheels 16. All of the modulators 20 and 22 are controlled by an ECU 30 that includes, among other things, a memory that stores computer-executable instructions and a processor configured to execute the computer-executable instructions.

The vehicle includes a foot brake valve 32 for controlling flow of pressurized air from one or more reservoirs (not shown) to the modulators 20 and 22. The foot brake valve 32 is actuated by an operator of the vehicle via a vehicle brake pedal 34. The foot brake valve 32 has a primary chamber 36 that is located in a primary circuit 38 of the vehicle braking system 10. The primary circuit 38 also includes a relay valve 40 between the foot brake valve 32 and the modulators 22. The primary circuit 38 is configured to control braking on the driven wheels 16. Specifically, when the brake valve 32 is actuated, air at a pressure determined by the amount of actuation of the brake pedal 34 is directed from the primary chamber 36 to the relay valve 40 as control air to actuate the relay valve. The relay valve 40, when actuated, directs air from a primary reservoir (not shown) to the modulators 22 of the driven wheels 16.

The foot brake valve 32 also has a secondary chamber 42 that is located in a secondary circuit 44 of the vehicle braking system 10. The secondary circuit 44 is configured to control braking of the non-driven wheels 14. Specifically, when the brake valve 32 is actuated, air from a secondary reservoir (not shown) flows through the secondary chamber 42 to the modulators 20 of the non-driven wheels 14, at a pressure determined by the amount of actuation of the brake pedal 34.

The system 10 also includes a brake valve actuator (BVA) 50 that is an actuatable device interposed between the brake valve and the brake pedal. In one embodiment, the BVA 50 includes a pneumatic piston configured to actuate the brake valve independent of the foot pedal 34. The BVA 50 is controlled (e.g., piloted) by a BVA modulator 52 that is provided with supply air. In the exemplary embodiment, the BVA modulator 52 includes at least one electrical proportional solenoid valve for controlling supply air provided to the BVA 50 and, thus, a level of autonomous braking to be applied. The BVA modulator 52 in turn is controlled by the ECU 30, which provides an electrical signal to the BVA modulator 52 to thereby control the supply air provided to the BVA 50. The BVA modulator 52, when operated, directs supply air to the BVA 50 to actuate the BVA 50 and thereby actuate the dual brake valve 32 to effect autonomous braking action.

The BVA 50 may be used in a known manner for conducting a pre-trip inspection, in which the brakes are set and held in an applied condition so that the driver can check the braking system of the vehicle without having to be in the cab pressing on the brake pedal 34. In this regard, a hand actuator 54 or the like is provided that can be actuated with by the driver to hold the brakes in an applied condition. When a pre-trip inspection is to be performed, a driver actuates the hand actuator 54 which provides a signal to the ECU 30, which in turn provides a signal to the BVA modulator 52 that results in the application of the brakes.

It will be appreciated that the ECU 30 is operative to actuate the BVA modulator 52 independently of driver input (e.g., via the foot pedal 34 and/or the hand actuator 54) for performing automated braking functions such as ATC, ESC, etc.

To this end, the ECU 30 is provided with inputs from one or more sensors for sensing a dynamic vehicle condition for which it may be desirable to make braking pressure available to the driven or non-driven wheels of the vehicle, independently of driver demand. Specifically, the ECU 30 may be provided with input from one or more wheel spin sensors 31, associated with the driven wheels of the vehicle and the non-driven wheels of the vehicle. The ECU 30 may also be provided with input from one or more rollover condition sensors 33 that are operative to sense conditions such as lateral acceleration that are indicative of a possible rollover condition of the vehicle. Other types of sensor inputs may be provided, in addition or alternatively.

Should wheel spin at the driven wheels 16 be sensed, the ECU 30 may determine that the automatic traction control (ATC) function of the system 10 should be provided to stop the wheel spin. If such a determination is made, the ECU 30 provides an electrical signal to the BVA modulator 52. The BVA modulator 52, which as noted can be include a pair of electric proportional solenoid valves, directs the supply air to the BVA 50, thereby actuating the BVA 50 which in turn actuates the dual brake valve 32 which delivers braking pressure to the first and second circuits.

When the dual brake valve 32 is thus actuated by the ECU 30, air from the secondary reservoir flows through the secondary chamber 42 to the modulators 20 of the non-driven wheels 14. The ECU 30 when in the ATC mode controls the modulators 22 to block flow of air to the brake chambers of the non-driven wheels 14. Therefore, no braking effect is provided at the non-driven wheels 14, as is desired.

Meanwhile, air under pressure is directed from the primary chamber 36 to the relay valve 40 as control air, thus actuating the relay valve. The relay valve 40, when actuated, directs air from the primary reservoir to the modulators 22 of the driven wheels 16. The ECU 30, when in the ATC mode, selectively controls the modulators 22 associated with the driven wheels 16 to enable or block flow of air to the brake chambers of the driven wheels. Braking effect is provided as desired at the driven wheels 16, to stop the wheel spin. The autonomous braking effect can be applied and released under the control of the ECU 30.

The application of autonomous braking effects to the driven wheels 16 is done without any driver input (e.g., without pressing on the brake pedal 34). Thus, the automatic traction control function is provided. Because the brake valve actuator 50 is used to energize the primary braking circuit 38, a standard relay valve 40 can be used in the primary circuit, rather than a relay valve with an ATC solenoid, as in prior systems. While in general the automated braking feature is applied without driver input, as will be described in more detail below, one or more sensors can be provided for sensing driver input (e.g., pedal position) and such information can be used to allow the driver to maintain full operational control of the brake system, regardless of whether an autonomous braking event is underway when the driver presses on the brake pedal.

Figure 1:
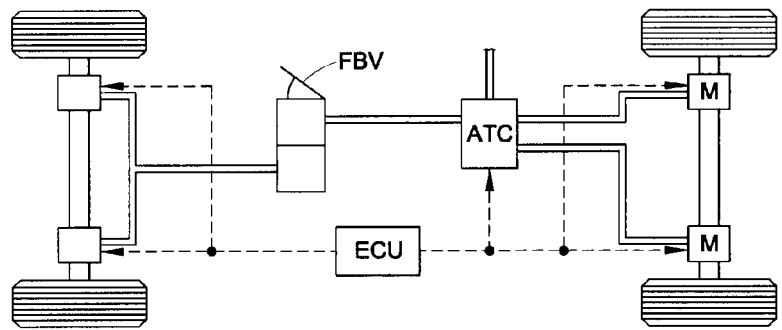
FIG. 1 is a schematic illustration of a prior art braking system for a straight truck or bus, having an ATC capability.

The afore-described system makes advantageous use of the fact that the vehicle 12 already has a device (the BVA 50) which is operative to energize the vehicle braking system 10 in the absence of brake pedal actuation. Putting the BVA 50 under the control of the ECU 30 enables the provision of autonomous braking effects under computer control and thus enables the provision of the automatic traction control function without the need for the more complex and expensive ATC hardware shown in the prior art system of FIG. 1.

It will be appreciated that being able to control the BVA 50 electrically via the proportional solenoid valve of the BVA modulator 52 with the ECU 30 provides additional advantages. The ECU 30 can control operation of the BVA 50 so that it is not erroneously actuated, for example, by the solenoid when the vehicle 12 is moving. The service brakes can also be applied using the ECU 30 to control the BVA 50. Some vehicles include a function by which service brakes are automatically applied by actuating the BVA 50, in certain circumstances. For example, the service brakes of a school bus might be automatically applied when the school bus door is opened with the lights flashing. In such a vehicle, the ECU 30 can be programmed to disable this function when it is not safe to have it in effect, for example, while the vehicle is moving. Other BVA functions can also be disabled in such circumstances, for example, the pre-trip function, or any other brake actuation other than the one provided for by the driver's foot or hand control. Thus, putting the BVA 50 under control of the ECU 30 adds functionality to the BVA in the form of a safety interlock to prevent misuse of the brakes via the BVA.

Another advantage of the present disclosure is the provision of a desired level of autonomous braking direct from the BVA 50. To this end, a pressure sensor is provided that senses the pressure (e.g., the delivery pressure) from the foot valve. By sensing this pressure, the level of braking supplied to the wheel chambers can be determined with accuracy. By sensing and communicating the delivery pressure to the ECU 30, the modulator 52 can be commanded to apply a desired autonomous braking level.

Figure 3:
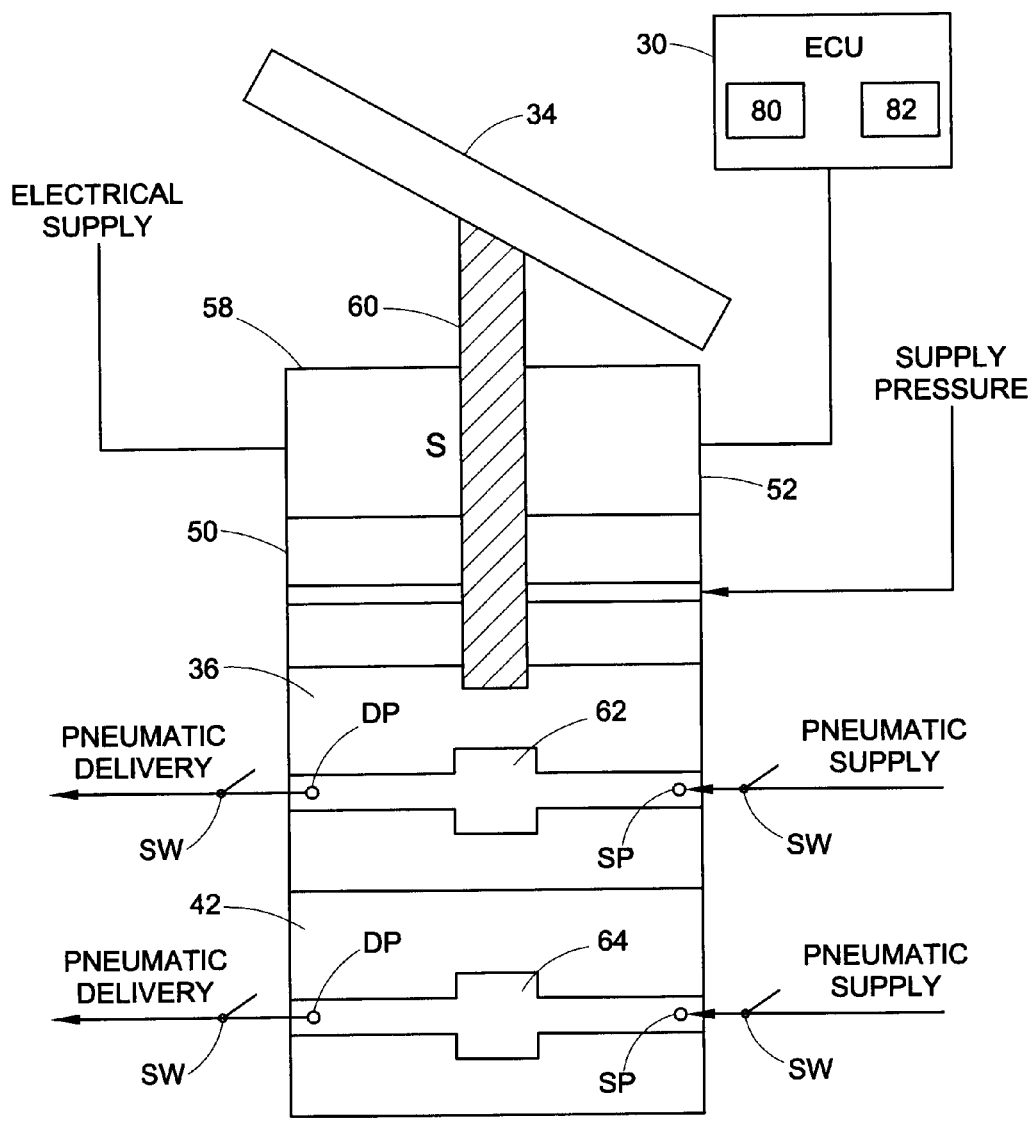
FIG. 3 is schematic illustration of an exemplary dual circuit pneumatic foot valve in accordance with the present disclosure.

Turning to FIG. 3, the details exemplary dual brake valve 32 are shown. In this embodiment, the brake valve 32 is a dual circuit pneumatic foot valve with electronically controlled proportional modulation (ECPM) and operator input sensing. As noted, the valve 32 includes the primary and secondary chambers 36 and 42, the BVA 50 and the BVA modulator 52. All of these components are supported in a common housing 58, which can be mounted in a cabin of a vehicle. Generally speaking, the cabin of a vehicle is a cleaner and more stable environment as opposed to alternative exterior locations where certain components of prior art systems are often mounted. Accordingly, the brake valve of the present disclosure is shielded from most if not all environmental contaminants which may provide a longer operational life. Although the exemplary brake valve of FIG. 3 is a dual brake valve having two chambers, single brake valves or brake valves having more than two chambers are also contemplated.

The primary and secondary chambers 36 and 42 each receive compressed air via pneumatic supply ports SP and deliver compressed air via pneumatic delivery ports DP. A push-through plunger 60 is operatively connected between the pedal 34 and respective valve members 62 and 64 of the primary and secondary chambers 36 and 42 for actuating the brake valve when a driver depresses the pedal 34 to supply pressure to the primary and secondary circuits. Additionally, the BVA 50 is configured to actuate the brake valve members 62 and 64 in response to pilot pressure controlled by the BVA modulator 52. As noted, the BVA modulator 52 in this embodiment is a pair of proportional solenoid valves configured to receive a control signal from the ECU 30 and supply the appropriate pilot pressure signal to the BVA 50 to supply a desired pressure to the primary and/or secondary circuits. Other BVA modulators are also contemplated, including servos and/or stepper motors, for example.

The brake valve 32 also includes a plurality of sensors S for sensing pressure at various points. For example, the pneumatic supply and delivery ports SP and DP can each include a pressure sensor for sensing pressure. The sensors can be connected to the ECU 30 for providing feedback related to the operation of the brake valve 32. In addition or in the alternative, one or more pressure switches SW can be provided.

In addition, at least one sensor S is configured to sense the position of the brake pedal 34 and/or plunger 60. This sensor, which can be one or more Hall Effect sensors or the like, is adapted to send a signal to the ECU 30 indicative of a driver braking command when the driver depresses the pedal 34. Information regarding the amount of braking demanded by the driver can be used to enhance operation of the brake system. For example, if an ATC event is ongoing and the driver depresses the pedal 34, the sensor S can communicate this information to the ECU 30, and the ECU 30 can cease the ATC operation by, for example, stopping any actuation of modulators 22 to allow full driver demanded braking. It will be appreciated that the ECU 30 includes various inputs and outputs for communicating with the various valve sensors and/or vehicle sensors. In addition, the ECU includes a memory 80 for storing computer-executable instructions, and a processor 82 for executing the instructions to, among other things, generate a control signal for controlling the BVA modulator 52.

It will be appreciated that during operation, the brake valve 32 is proportionally actuatable by the vehicle operator via the plunger 60 which is operatively connectable to the brake pedal 34. During normal vehicle operation, the brake valve 32 functions as a typical brake valve supplying pressure to the primary and secondary circuits when demanded by the driver. When the ECU 30 initiates an automated braking function such as ATC, the BVA 50 is activated by the BVA modulator 52 to actuate the brake valve to supply braking pressure to the braking circuits as described above.

It should be appreciated that the plunger 60 can be actuated via the brake pedal 60 to operate the brake valve to deliver a maximum pressure to the braking circuit regardless of the state of the BVA 50 and/or the BVA modulator 52. This provides a mechanical push-through that is configured to allow a driver to override any automated braking function and "push through" the driver input to deliver pressure to the primary and secondary circuits as desired. In contrast to brake-by-wire systems, the exemplary valve provides for enhanced autonomous braking features while maintaining the driver r in full control of the brake valve to effect maximum braking if and when necessary.

Figure 4:
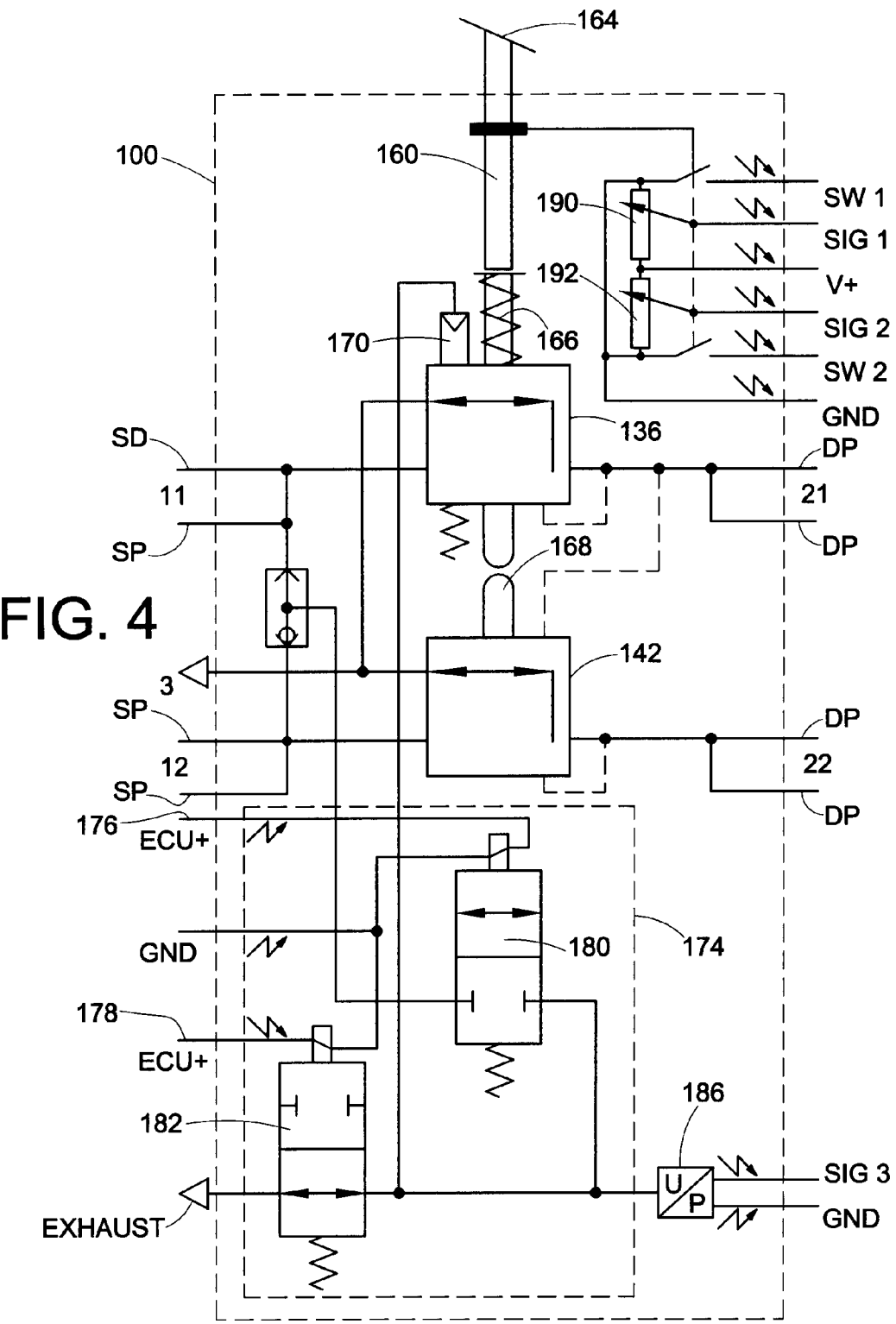
FIG. 4 is a schematic diagram of an exemplary braking system in accordance with the present disclosure.

Turning now to FIG. 4, a schematic diagram of another exemplary pneumatic brake valve with ECPM and position sensing in accordance with the disclosure is shown. Brake valve 100, like brake valve 32 of FIG. 3, is a dual circuit pneumatic foot valve including primary and secondary brake chambers 136 and 142 that receive compressed air via pneumatic supply ports SP and deliver compressed air for braking via pneumatic delivery ports DP. A push-through plunger 160 is operatively connected between a foot pedal 164 and respective valve members 166 and 168 of the primary and secondary chambers 136 and 142 for actuating the brake valve when a driver depresses the pedal 164 to supply pressure to the primary and secondary circuits. Additionally, a brake valve actuator in the form of a pneumatic piston 170 is configured to actuate the brake valve members 162 and 164 in response to pilot pressure controlled by a BVA modulator 174.

The BVA modulator 174 includes a pair of proportional solenoid valves configured to receive a control signal from an ECU (not shown) via respective ECU ports 176 and supply the appropriate pilot pressure signal to the piston 174 to supply a desired pressure to the primary and/or secondary circuits. A first normally closed electric proportional solenoid 180 is configured to, when closed, deliver pressurized air to the piston 174. A second normally open electric proportional valve 182 is in communication with the line connecting the first solenoid 180 to the piston 174 and is configured to vent to atmosphere to modulate the pressure signal supplied to the piston 174 by solenoid 180. Working together, solenoids 180 and 182 deliver a desired pilot pressure to piston 174 during an autonomous braking event. For example, solenoid 180 can be configured to supply line pressure of 120 psi to piston 174, and solenoid 182 can be actuated to reduce said line pressure to 65 psi by venting to atmosphere.

The brake valve 100 includes a pressure sensor 186 configured to sense pressure delivered by the modulator 174 to the piston 170. Pressure sensor 186 can be connected to the ECU allowing the ECU to control the modulator 174 in a closed-loop process to deliver a precise pilot pressure to the piston 170.

In addition, a pair of potentiometers 190 and 192 are configured to sense the position of the brake pedal 164 and/or plunger 160. Alternatives to the potentiometers include Hall Effect sensors or position switches. The potentiometers are adapted to send a signal to the ECU indicative of a driver braking command when the driver depresses the pedal 164. Information regarding the amount of braking demanded by the driver can be used to enhance operation of the brake system. For example, if an ATC event is ongoing and the driver depresses the pedal 164, the ECU 30 can cease the ATC operation and allow the brake valve to function in a purely pneumatic state of operation.

It should now be appreciated that aspects of the present disclosure provide a brake valve with enhanced performance characteristics such as fully proportional autonomous braking functionality. In addition, aspects of the disclosure reduce the need to cycle remote wheel end modulators during autonomous braking events since the disclosed brake valve can supply a desired braking pressure directly to a braking circuit. That is, unlike prior art systems that supply full line pressure to a brake circuit and then reduce the line pressure with wheel end modulators or the like, the disclosed brake valve can simply deliver the desired pressure to the brake circuit without downstream modulation. This can increase component longevity by reducing the amount of time the wheel end modulator is active.

Moreover, because aspects of the disclosure facilitate autonomously providing a known and desired braking pressure directly to a brake circuit, certain autonomous braking features that heretofore generally were not implemented on trailers due to unknown factors (e.g., trailer weight, load distribution, etc.) can now be implemented. For example, certain autonomous braking features, such as ESC and/or RSC, which typically are not implemented unless trailer weight is known, can be implemented regardless of whether trailer weight is known using the exemplary brake valves disclosed herein. This is because the exemplary brake valves can deliver relatively precise, autonomous braking pressure to the trailer circuit without relying on downstream modulators to adjust the braking pressure in an open loop fashion.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A foot control valve assembly for operating a vehicle brake system having an associated brake pedal and at least one braking circuit associated with one or more wheels of the vehicle, the valve assembly comprising:
    a brake valve for selectively applying braking pressure to the at least one braking circuit of the vehicle, the brake valve being proportionally actuatable by a vehicle operator via a plunger operatively connectable to the associated brake pedal;
    a brake valve actuator for selectively actuating the brake valve to effect an autonomous braking function, the brake valve actuator responsive to a pneumatic control signal;
    an electronically controlled proportional modulator responsive to an electronic control signal received from an associated controller, the electronically controlled proportional modulator configured to modulate the pneumatic control signal provided to the brake valve actuator to control actuation of the at least one brake valve during an autonomous braking event; and
    at least one sensor for sensing driver braking demand, the sensor configured to communicate sensed driver braking demand to the associated controller.

2. The foot control valve assembly of claim 1, wherein said plunger can be actuated via the associated brake pedal to operate the brake valve to deliver pressure to the braking circuit regardless of the state of the electronically controlled proportional modulator.

3. The foot control valve assembly of claim 1, wherein a first end of the plunger is adapted for connection to the associated brake pedal, and a second end of the plunger is adapted to actuate the at least one brake valve.

4. The foot control valve assembly of claim 1, wherein the brake valve, plunger, the brake valve actuator and the electronically controlled proportional modulator are supported by a common housing.

5. The foot control valve assembly of claim 1, wherein the brake valve actuator is a pneumatically actuated device that is configured to actuate the at least one brake valve.

6. The foot control valve assembly of claim 5, wherein the brake valve actuator includes a pneumatic piston.

7. The foot control valve assembly of claim 1, wherein the electronically controlled proportional modulator is provided with supply air, the electronically controlled proportional modulator being responsive to the associated controller for selectively directing supply air to the brake valve actuator for actuating the at least one brake valve independently of the vehicle brake pedal.

8. The foot control valve assembly of claim 7, wherein the electronically controlled proportional modulator includes a normally closed solenoid valve supplied with line pressure and a normally open solenoid valve, wherein during an autonomous braking event, the normally closed solenoid valve opens to supply the brake valve actuator with a supply of pressurized air, and the normally open solenoid valve is cycled to selectively vent air to atmosphere to thereby control the pressure supplied to the at least one brake valve.

9. The foot control valve assembly of claim 1, wherein the at least one sensor includes a Hall effect sensor for sensing a position of the plunger.

10. The foot control valve assembly of claim 1, further comprising the brake pedal operatively connected to the plunger.

11. The foot control valve assembly of claim 1, wherein the electronically controlled proportional modulator includes a port for receiving a command signal from the associated controller.

12. A vehicle braking system including at least one brake chamber, the foot valve control assembly of claim 1 operatively connected to the at least one brake chamber for supplying pressurized air thereto, and a controller operatively connected to the electronically controlled proportional modulator for supplying a control signal to the modulator for actuating the brake valve independently of actuation by a vehicle operator.

13. A vehicle braking system as set forth in claim 12, further comprising at least one sensor for sensing a dynamic vehicle condition, the electronic control unit generating the electronic control signal for actuating the brake valve actuator as a function of the dynamic vehicle condition.

14. A method of operating a vehicle brake system having a brake pedal and at least one braking circuit associated with one or more wheels of the vehicle, the method comprising:

selectively applying braking pressure to the at least one braking circuit of the vehicle with a brake valve, the brake valve being proportionally actuatable by a vehicle operator via a plunger operatively connectable to the brake pedal;

selectively actuating the brake valve independently of an operator input via the associated brake pedal with a brake valve actuator to effect an autonomous braking event, the brake valve actuator responsive to a pneumatic control signal;

modulating the pneumatic control signal provided to the brake valve actuator to control actuation of the at least one brake valve with an electronically controlled proportional modulator responsive to an electronic control signal received from a controller; and sensing driver braking demand with at least one sensor adapted to sense a position of the plunger.

15. A method as set forth in claim 14, further comprising comparing the sensed-data corresponding to driver braking demand to the controller to a level of braking associated with the autonomous braking event, and terminating the autonomous braking event when the driver braking demand exceeds the level of braking associated with the autonomous braking event.

16. The method as set forth in claim 14, wherein the modulating further includes generating with the controller a control signal and communicating the control signal to the proportional modulator.

17. The method of claim 14, further comprising sensing a dynamic vehicle condition with at least one sensor, and wherein the generating includes generating a control signal based at least in part on the dynamic vehicle condition sensed.

18. The method of claim 14, further comprising supplying the electronically controlled proportional modulator with supply air and modulating the delivery of the supply air to the brake valve actuator to actuate the brake valve independently of the brake pedal, wherein the modulating includes exhausting a portion of the supply air to atmosphere.

* * * * *